(12) United States Patent
Angermayer

(10) Patent No.: US 9,652,363 B2
(45) Date of Patent: May 16, 2017

(54) DEPENDENT OBJECT DELEGATION TESTER

(71) Applicant: Thomas Angermayer, Stetten (DE)

(72) Inventor: Thomas Angermayer, Stetten (DE)

(73) Assignee: SuccessFactors, Inc., South San Francisco, CA (US)

( * ) Notice: Subject to any disclaimer, the term of this patent is extended or adjusted under 35 U.S.C. 154(b) by 4 days.

(21) Appl. No.: 14/571,160

(22) Filed: Dec. 15, 2014

(65) Prior Publication Data

US 2016/0170860 A1    Jun. 16, 2016

(51) Int. Cl.
*G06F 9/44* (2006.01)
*G06F 11/36* (2006.01)

(52) U.S. Cl.
CPC .................. *G06F 11/362* (2013.01)

(58) Field of Classification Search
CPC .................................................. G06F 11/362
USPC ................................ 717/126, 124
See application file for complete search history.

(56) References Cited

U.S. PATENT DOCUMENTS

| | | | |
|---|---|---|---|
| 6,560,609 B1 * | 5/2003 | Frey | G06F 9/465 |
| 7,231,595 B1 * | 6/2007 | Fujino | G06F 21/41 |
| | | | 715/200 |
| 7,561,875 B1 * | 7/2009 | Eberle | G06F 11/2294 |
| | | | 455/41.2 |
| 7,996,816 B2 * | 8/2011 | Francis | G06F 11/3696 |
| | | | 717/124 |
| 8,060,863 B2 * | 11/2011 | Brunswig | H04L 41/5009 |
| | | | 717/100 |
| 8,682,829 B2 * | 3/2014 | Barthel | G06Q 10/10 |
| | | | 705/19 |
| 2002/0066077 A1 * | 5/2002 | Leung | G06F 11/368 |
| | | | 717/126 |
| 2005/0021276 A1 * | 1/2005 | Southam | H04L 12/2697 |
| | | | 702/122 |
| 2005/0021354 A1 * | 1/2005 | Brendle | G06F 9/465 |
| | | | 717/100 |
| 2007/0006278 A1 * | 1/2007 | Ioan Avram | G06F 21/6218 |
| | | | 726/1 |
| 2009/0138621 A1 * | 5/2009 | Hackmann | G06Q 10/06 |
| | | | 710/5 |
| 2010/0318556 A1 * | 12/2010 | McKay | G06Q 10/10 |
| | | | 707/769 |
| 2010/0318974 A1 * | 12/2010 | Hrastnik | G06F 11/3696 |
| | | | 717/135 |

(Continued)

OTHER PUBLICATIONS

NPL—Donahue—googlemock for dummies—2015, Author: Donahue, Title "What is Google C++ Mocking Framework?", Located at https://github.com/google/googlemock/blob/master/googlemock/docs/v1_7/ForDummies.md.*

(Continued)

*Primary Examiner* — Ted T Vo
*Assistant Examiner* — Hossain Morshed
(74) *Attorney, Agent, or Firm* — Mintz Levin Cohn Ferris Glovsky and Popeo, P.C.

(57) ABSTRACT

A dependent object delegation testing approach can feature use of a dependent object delegation tester object that prompts a service provider to make delegation calls and a mock enterprise services infrastructure that include mock objects for receiving the delegation calls and verifying compliance of those delegation calls with one or more predefined check types.

20 Claims, 7 Drawing Sheets

(56) References Cited

U.S. PATENT DOCUMENTS

| | | | |
|---|---|---|---|
| 2011/0239194 A1* | 9/2011 | Braude | G06F 11/3688 717/124 |
| 2011/0271284 A1* | 11/2011 | Simonian | G06F 11/3664 718/102 |
| 2012/0084754 A1* | 4/2012 | Ziegler | G06F 11/3696 717/124 |
| 2014/0046720 A1* | 2/2014 | Ramamurthy | G06Q 10/06395 705/7.26 |
| 2014/0173632 A1* | 6/2014 | Haselberger | G06F 8/24 719/316 |

OTHER PUBLICATIONS

Silence in a reference can sometimes be anticipation, Author: Hazzah, et al., Title: "Silence in a reference can sometimes be anticipation", Located at http://allthingspros.blogspot.com/2010/05/anticipation-reference-silence-silent.html.*

* cited by examiner

| | |
|---|---|
| Business Objects: | 773 |
| Standard Business Objects: | 508 |
| Template Business Objects: | 34 |
| Projection Business Objects: | 157 |
| Dependent Objects: | 71 |
| Business Objects containing DOs: | 328 |
| BOs which contain at least three DOs: | 167 |
| BOs which contain at least five DOs: | 93 |
| BOs which contain at least ten DOs: | 53 |
| Dependent Objects Usage: | 1268 |

FIG. 1

DEPENDENT OBJECT DELEGATION TESTER

TECHNICAL FIELD

The subject matter described herein relates to the use of dependent objects and delegation to dependent objects, for example in business software applications.

BACKGROUND

Use of dependent objects has become increasingly important in object oriented programming, particularly in business software. One aspect of this approach is the use of data objects, which can also be referred to as business objects, to divide functionality into smaller units. These smaller units can be more readily coded, verified, debugged, etc. than a more complicated software application that specifically implements multiple functions. As used herein, a data object is a programming structure, which can include executable code, metadata, data, etc., and which act as entry points to data and other functions within a software architecture. Among other possible features or properties, a data object can include an object type identifier, an object name, a type, an optional application designation (e.g. a designation of an application or applications to which the data object belongs), a program (e.g. coding that implements the functionality of the data object), etc.

Dependent object delegation generally refers to an object being called by another software component such that the calling software component relies on the dependent object to provide a specified set of functionalities. Handing a task over to another data object is referred to as the delegate. Delegation of a task from a service provider, or alternatively from a data or business object or other software component, to one or more dependent objects can allow the use of reusable business logic, which is encoded in the dependent object. Doing so can allow leveraging of multiple uses of functions and tasks that are coded once. A dependent object, in other words, can include functionality or the like that can be used by many business objects (or by other software components), for example through delegation of tasks to the dependent object, without being implemented directly in the software components that use the dependent object functionality.

SUMMARY

In one aspect, a method includes providing a simulated service call to a service provider from a dependent object delegation tester object. The simulated service call prompts the service provider to make one or more delegation calls to dependent objects in an enterprise services infrastructure. The one or more delegation calls from the service provider are received by one or more mock objects that are part of a mock enterprise services infrastructure. The one or more mock objects implement logic to verify compliance of the one or more delegation calls with one or more predefined check types and also provide results of the implemented logic to a debugger database for use in analyzing the service provider coding for errors.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 shows a table listing example object usage statistics for a business application;

When practical, similar reference numbers denote similar structures, features, or elements.

DETAILED DESCRIPTION

Figure 2:
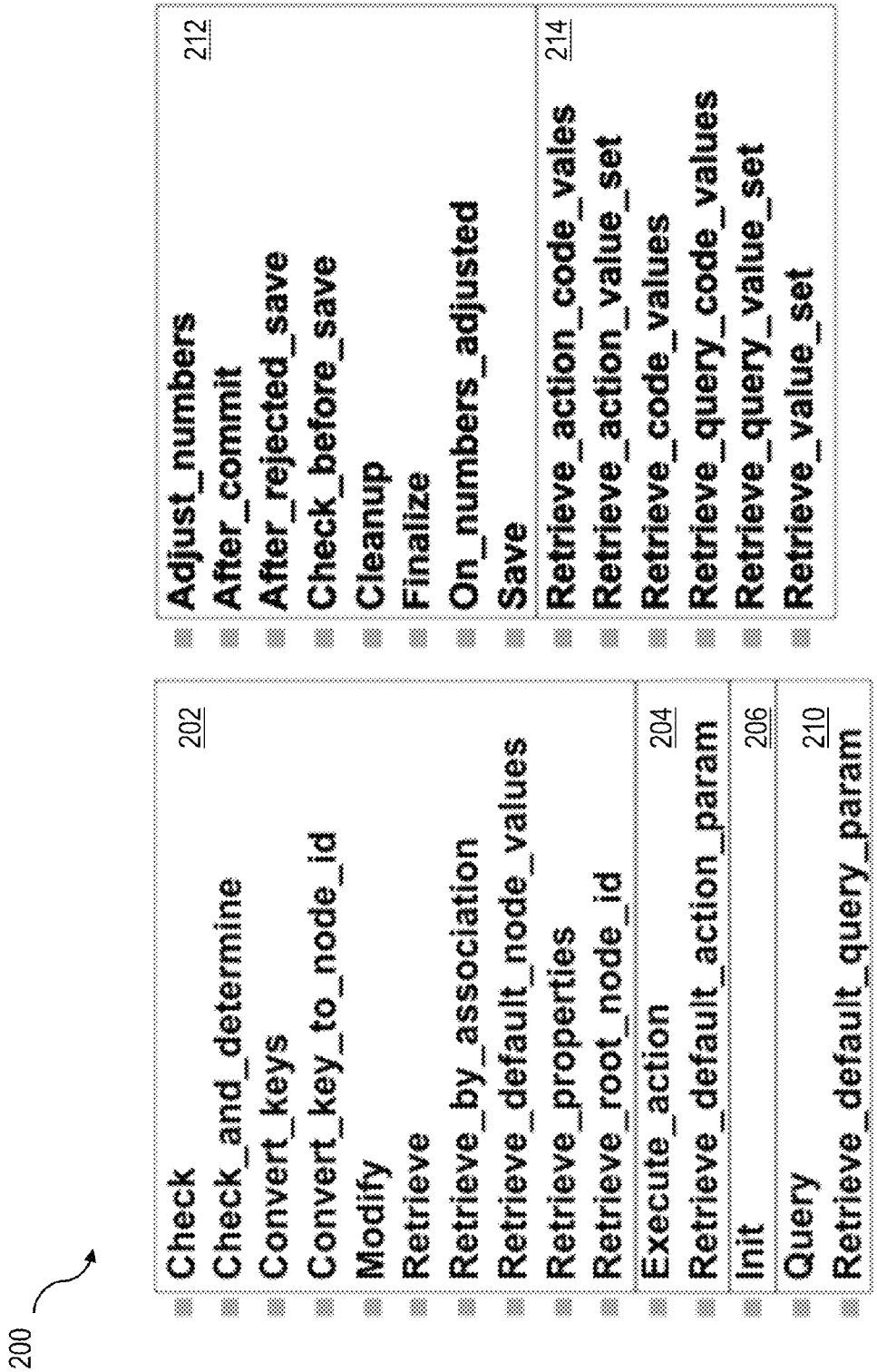
FIG. 2 shows a table listing examples of interfaces and services that can be part of an example service provider.

As noted above, delegation is generally a technique of replacing an original object type by its subtype to which additional events, methods, other functionality, etc. may be added. In an enterprise resource planning software application or other business application or set of business applications, a software vendor may include a set of standard data objects and standard events, methods, or other functionality. If a customer (e.g. an organization with users of an application provided by the software vendor) requires additional events, methods, or other functionality that are not provided by the application, the application can include the ability to accept modifications, for example by adding new events, methods, etc. to the original object types in the set of standard data objects. However, in general it is not possible to change the original object types. Rather, a business application can allow changes in data object behavior through the use of delegation of certain tasks to dependent objects. Using a delegation approach and dependent objects, customers of business software application can use their own object extensions with the tasks, events, etc. supplied by the software vendor. Standard objects of the business application can be used with customer extensions.

While errors in repeated coding of the functionality contained within a dependent object can be avoided, coding of delegation calls to such dependent objects can be deceptively complex. Because the coding of dependent object delegation can appear to be relatively simple, developers can be tempted to rely on a "copy and paste" approach to coding of new delegations. However, a delegation generally requires passing of multiple parameters, arguments, contextual information, technical keys, parent keys (e.g. of a delegating object), a kind of lock to be used (e.g. a read lock, a write lock, an optimistic lock, or the like), attribute names for attributes which need to be displayed, and the like. Simple duplication of previously coded delegations for use in a new application can introduce errors that can be difficult to detect. Furthermore, testing of the accuracy of the coding of delegation calls to dependent objects can be difficult, for example because of challenges that can arise in simulating all possible service calls in a debugger. Currently available automatic test procedures generally do not cover the complete delegation logic. Similarly, errors may not be easily found via normal approaches such as unit tests (e.g. an ABAP unit test for use with the Advanced Business Application Programming language available from SAP SE of Walldorf, Germany), and a core dump may not be an option for debugging.

Unit testing generally involves testing individual units of source code, sets of one or more computer program modules together with associated control data, usage procedures, operating procedures, etc. are tested to identify errors and the like. In object-oriented programming, a unit upon which a unit test is executed can be an entire interface, such as a class, an individual method, or the like. The level of complexity present in the numerous, optionally customizable delegations in a business software application can make unit testing difficult to perform and of questionable use if it cannot correctly simulate actual use cases.

Similarly, while a core dump can be useful in diagnosing and debugging errors in programming constructs, the complexity of dependent object delegation programming can allow errors in coding to exist unactivated for quite some time, in some cases even after release of the software to end users. For example, aspects of real-world usage may not have been triggered in testing of the application, particularly for dependent object calls that use dependent objects provided by multiple software vendors.

FIG. 1 and FIG. 2 illustrate the potential level of dependent object and delegation complexities that can arise in a business software application. FIG. 1 shows a table 100 listing representative statistics about an example business software application, including a total number of business objects, which includes standard business objects, template business objects, projection business objects, and dependent objects. Also listed in the table 100 are numbers of business objects that include delegations to dependent objects (DOs) as well as an estimate of the total amount of dependent object usage. These large number of delegations to dependent objects can significantly complicate coding and error checking of a business software application.

FIG. shows a table 200 listing examples of interfaces and services that can be part of an example service provider included within a business software application. As used herein, a service provider can be an object, an application, or the like that features functionality that is called by either an end user or another object, application, or the like. A service provider can in turn include delegation calls to one or more dependent objects, which can be business objects, data objects, other service providers, or the like. In general, a service provider is not a single piece of code that can be tested independently. Instead, in a typical multi-layer business software environment, a service provider is one of many interacting objects in the middle of a broader context, which can be referred to as an enterprise services infrastructure. Accordingly, designing useful tests for errors in the coding a service provider can be quite difficult. In the example illustrated in the table 200, the service provider includes six interfaces (e.g. Access 202, Action 204, Init 206, Query 210, Transaction 212, and ValueSet 214), which in turn include the twenty-nine services listed in the table 200.

Error checking of dependent object delegations can include several check types. Four examples of these check types are described here as types 1 through 4. Other check types may also be used within the scope of the current subject matter. A type 1 check can relate to delegation, for example to a service provider needing to delegate a call to a local client proxy of a dependent object without changing parameters and without locking any host objects. An error situation that can arise in association with a type 1 check can include the dependent object local client proxy not receiving any call when the service provider is called with a specific dependent object node name. Such an error can be evaluated as a critical error.

A type 2 check can relate to locking of a host object, for example if the service provider needs to first lock a host object before delegating a call to the dependent object local client proxy. An error situation that can arise in association with a type 2 check can include the service provider being called with a specific dependent object name and delegating the call to the dependent object local client proxy without locking the host object. A type 2 check can be done independently of the parameters. An error from a type 2 check can be evaluated as a warning, although in certain cases the error but can be critical.

A type 3 check can relate to processing of dependent object return data, for example if the service provider delegates a call to the dependent object local client proxy and then needs to pass the dependent object return data to an importing parameter object (e.g. property handler, message handler). An error situation that can arise in association with a type 3 check can include the service provider being called with a specific dependent object name and the call being delegated correctly to the dependent object local client proxy but the dependent object local client proxy returning data (e.g. properties, messages), at least some of which is not processed correctly by the service provider. An error from a type 3 check can be evaluated as a warning, although in certain cases the error but can be critical.

A type 4 check can relate to filling of correct exporting parameters, for example if the service provider delegates a call to the dependent object local client proxy and needs to add/set the dependent object return data to the service provider return data. An error situation that can arise in association with a type 4 check can include the service provider being called with a specific dependent object name and the call being delegated correctly to the dependent object local client proxy. However, the dependent object local client proxy returns data that are not filled into the return data of the service provider method. An error from a type 4 check can be evaluated as a critical error.

Figure 3:
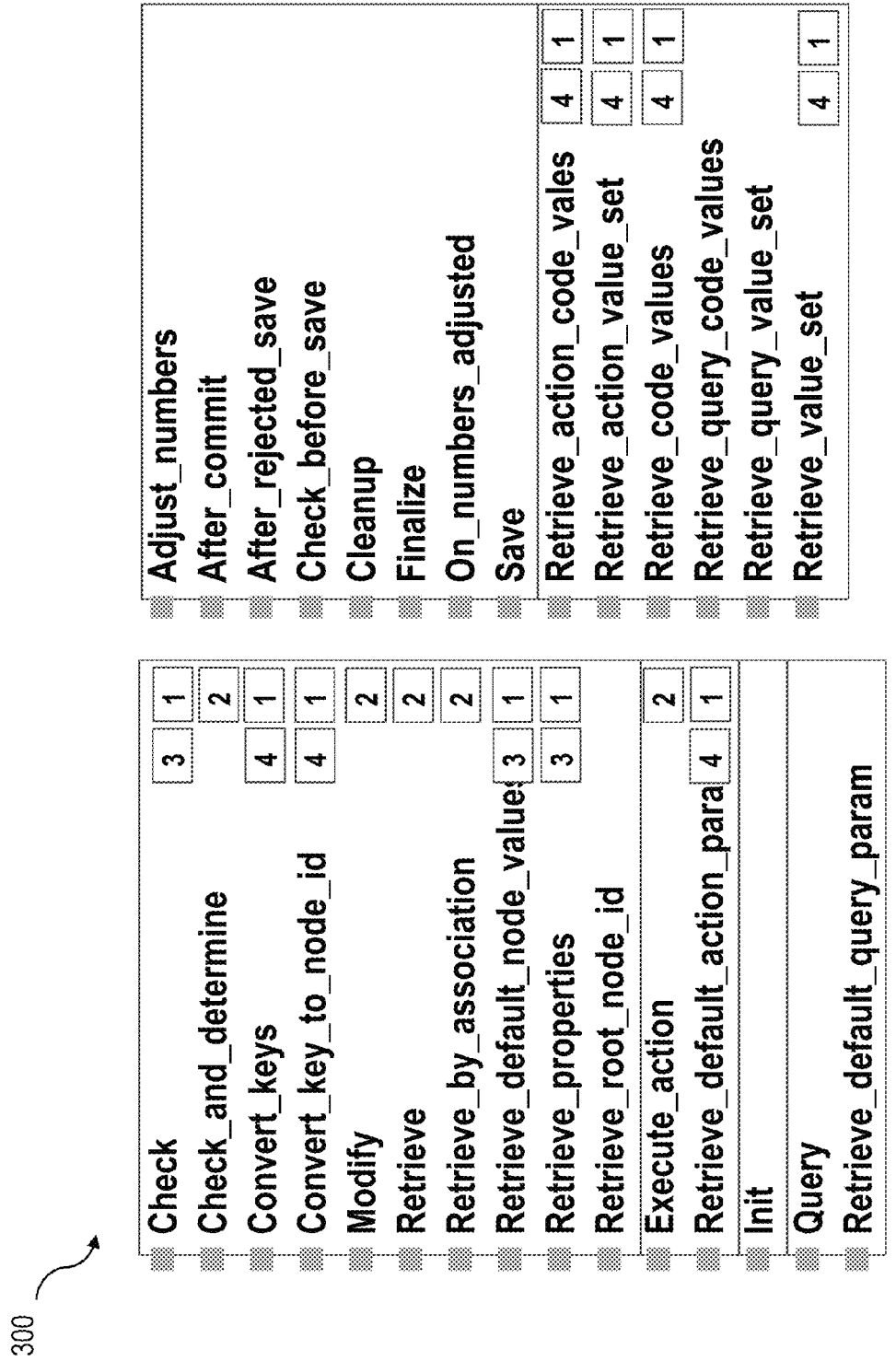
FIG. 3 shows a table listing check types that can be required for the interfaces and services of the service provider.

FIG. 3 shows a table 300, which lists the examples of interfaces and services that can be part of the example service provider discussed above in reference to the table 200 of FIG. 2. The table 400 also includes an indication of the check types (e.g. 1, 2, 3, or 4 as discussed above) that can apply for the various services. In this example, 15 services account for 25 checks: 10 of type 1, 5 of type 2, 3 of type 3, and 7 of type 4.

Figure 4:
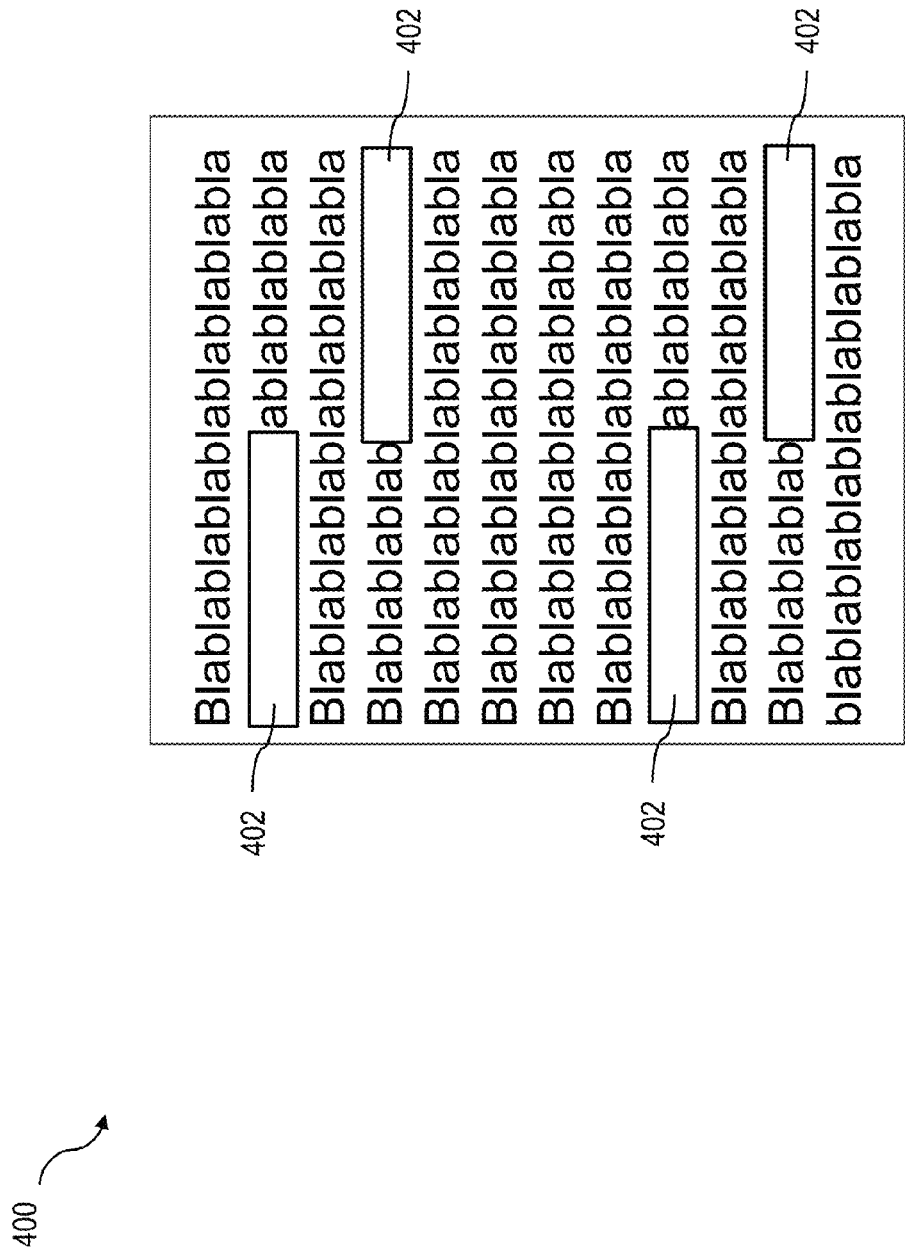
FIG. 4 shows an example of a generic template that can be used by developers for writing unit test code to test dependent object usage and delegation calls.

FIG. 4 shows an example of a currently available "generic" template 400 such as is typically used by developers for writing unit test code to test dependent object usage and delegation calls. Use of such a template 400 can require significant developer effort, particularly since the template must generally be manually completed for each new version build of a delegation structure (e.g. to include new dependent objects, to change a delegation hierarchy, etc.). Manual completion of such a template requires the developer or development team to enter a series of parameters and arguments defining the various contexts, semantics, passed arguments, expected responses, etc. for each delegation call in open fields 402 in the template. As noted above, this process can be quite time consuming (and therefore prone to simply being skipped by a busy developer), and the manual entry requirement can readily lead to difficult to detect errors such that testing with the template may not reveal one or more actual issues with delegation coding for dependent objects. Furthermore, for business software applications coded in ABAP, dynamic calls of private instance variables may not be testable using such an approach without real customer data.

Implementations of the current subject matter can provide an independent, "generic" test framework in which coding of dependent object delegation calls can be checked without using real data. Each check can be executed using a "Service Tester," which can be an business object (e.g. a dependent object delegation tester object) having functionality discussed in greater detail below. Such an approach can provide one or more advantages, which can include, but are not limited to, reductions in developer effort for finding errors; use of a service tester object as a standalone transaction; use of the service tester object within a local unit test (e.g. an ABAP unit test); integration of the service tester object into a generic check tool, ease of adding, enabling, or disabling checks; and the like. As used herein, a service tester object or other implementation of service tester functionality can refer to a (unit) test for a combination of operations including "service to test" and "check type." In other words, a service tester object can perform operations that include preparing data, calling a corresponding service of a service provider implementation to be tested, and performing relevant checks (e.g. as described above in regards to the check types).

Figure 5:
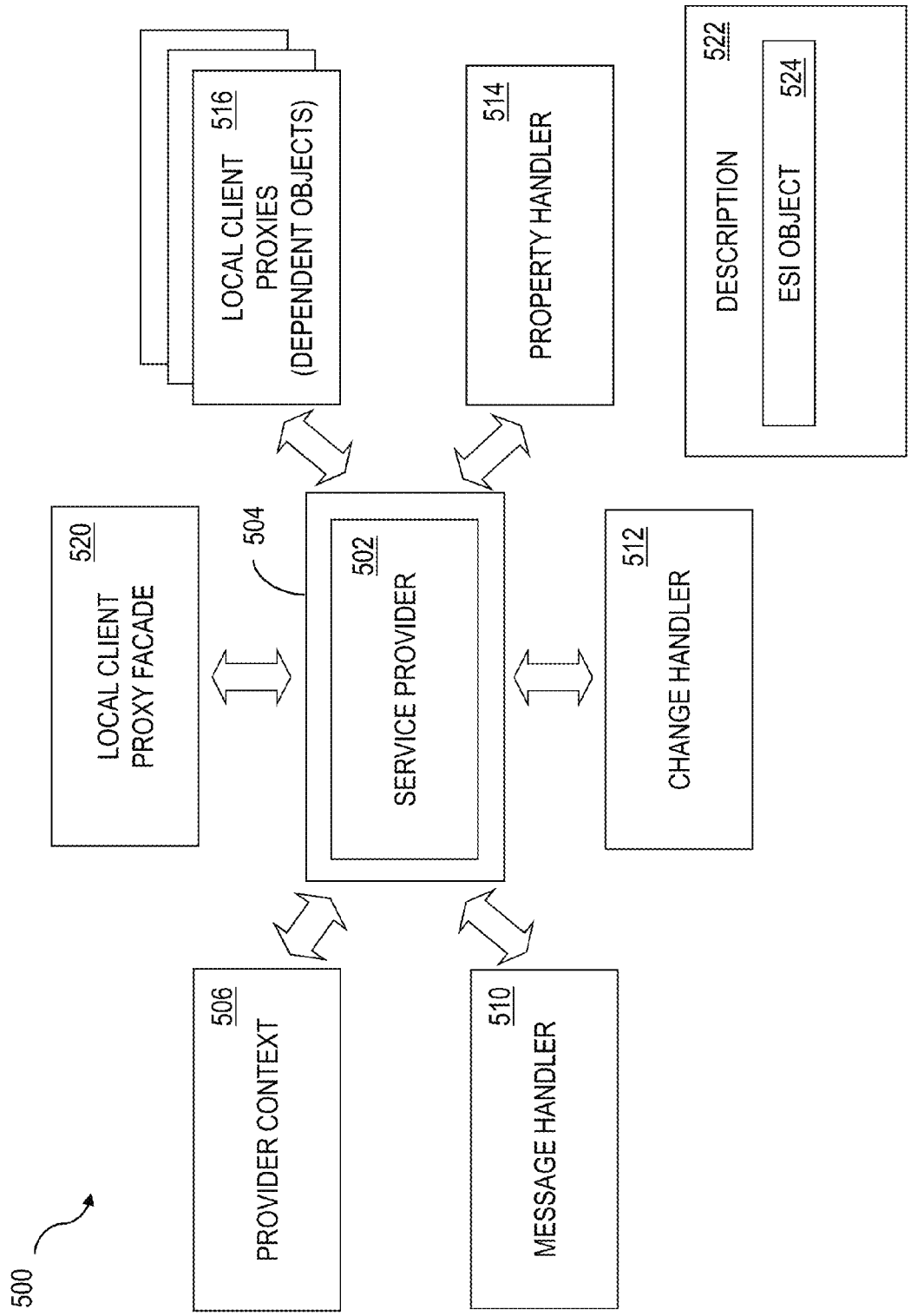
FIG. 5 shows a diagram of an enterprise services infrastructure.

FIG. 5 shows a diagram of part of an enterprise services infrastructure 500 that includes a service provider 502. The service provider can be part of a business object 504. The A plurality of components in the enterprise services infrastructure 500 may be used by the service provider 502 via dependent object delegations that enable extended functionality to be added to the service provider 502. In FIG. 5, the enterprise services infrastructure 500 includes a provider context 506, a message handler 510, a change handler 512, a property handler 514, one or more local client proxies 516 of dependent objects, and a local client proxy facade 520. A description 522 of the enterprise services infrastructure 500 can be provided by enterprise services infrastructure description object 524. As noted above, the complex interaction between the various components in an enterprise services infrastructure can make debugging of depended object delegation calls very difficult. In particular, the check types discussed above (e.g. types 1 through 4) can be very challenging to perform without the enterprise services infrastructure being operated with real data.

Figure 6:
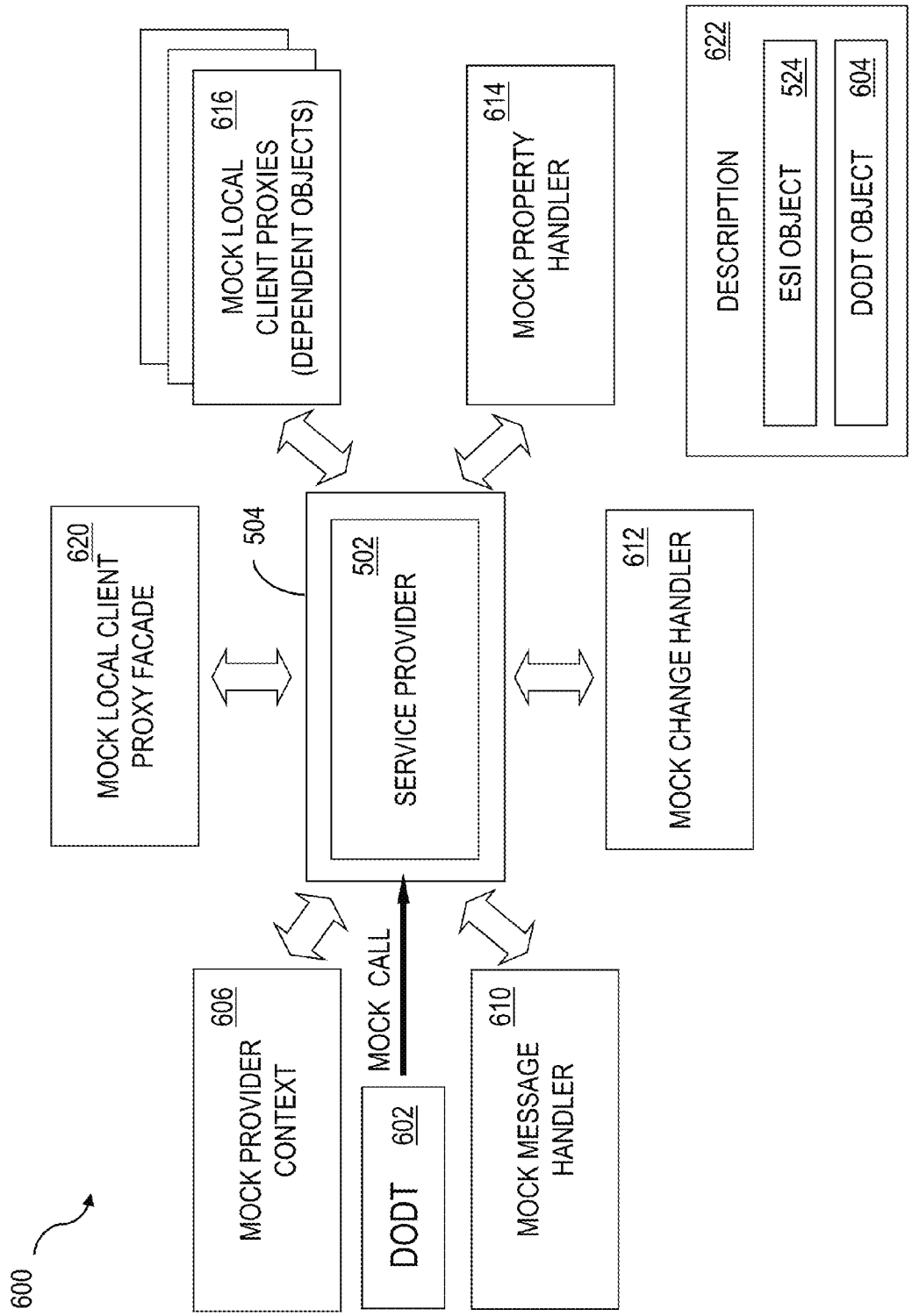
FIG. 6 shows a diagram of a mock enterprise services infrastructure consistent with implementations of the current subject matter.

FIG. 6 shows a mock enterprise services infrastructure 600 that can be part of an approach consistent with implementations of the current subject matter. The mock enterprise services infrastructure 600 can include a dependent object delegation tester object (also referred to herein as a service tester or a service tester object) 602 as well as a mock provider context 606, a mock message handler 610, a mock change handler 612, a mock property handler 614, one or more mock local client proxies 616 of dependent objects, and a mock local client proxy facade 620. These mock components can be programmed to behave like actual components and to react to calls from the service provider 502 in a manner necessary to verify that the call was properly configured. This verifying can include checking for the proper addressing, parameters, etc. in the call. A description 622 of the mock enterprise services infrastructure 600 can include the enterprise services infrastructure description object 524 for the enterprise services infrastructure 500 as well as a dependent object delegation tester object description object 604.

Figure 7:
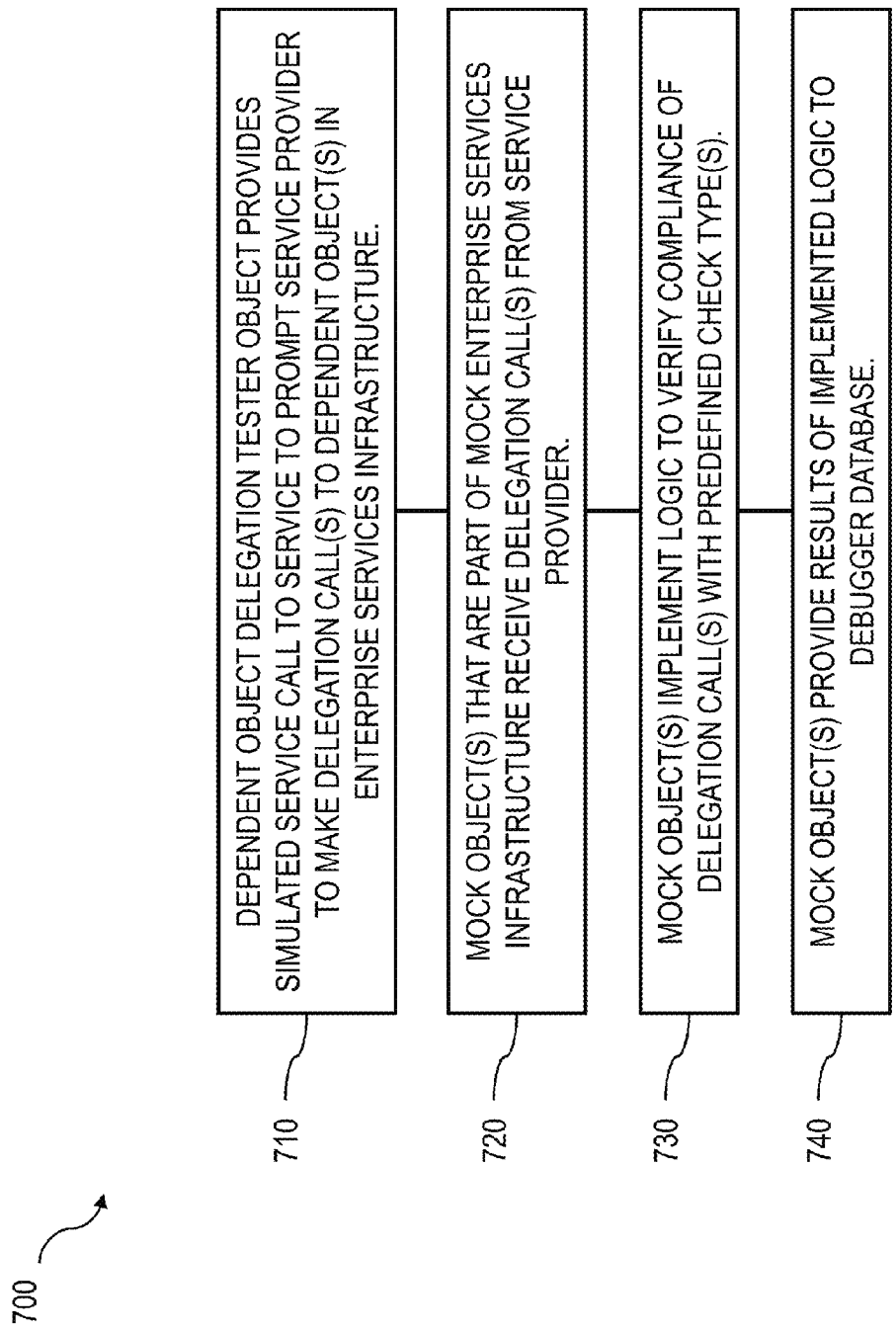
FIG. 7 shows a process flow diagram illustrating aspects of a method having one or more features consistent with implementations of the current subject matter.

FIG. 7 shows a process flow chart 700 illustrating features of a method consistent with implementations of the current subject matter. At 710, a simulated (e.g. a mock) service call is provided to a service provider 502 from the dependent object delegation tester object 602. The simulated service call prompts the service provider to make one or more delegation calls to dependent objects (which refers herein to any software component, including but not limited to those shown in and discussed in relation to FIG. 5). The one or more delegation calls from the service provider 502 are received by one or more mock objects at 720, which at 730 implement logic to verify compliance of the one or more delegation calls with one or more predefined check types. The one or more predefined check types can be determined based on the content of the enterprise services infrastructure description object 524 and can be stored in the dependent object delegation tester object description object 604. At 740, the one or more mock objects provide results of implementation of the logic for verifying compliance of the one or more delegation calls with the one or more predefined check types to a debugger database (not shown) for use in analyzing the service provider coding for errors.

The process can be repeated for multiple service providers within an enterprise services infrastructure 500. The mock objects can be programmed to expect certain behavior consistent with the check types and to detect deviation from expected behavior in a delegation call.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

providing a simulated service call to a service provider from a dependent object delegation tester object, the simulated service call prompting the service provider to make one or more delegation calls to dependent objects in an enterprise services infrastructure;

receiving the one or more delegation calls from the service provider by one or more mock objects, the one or more mock objects being part of a mock enterprise services infrastructure;

determining one or more predefined check types based on a provided description of the enterprise services infrastructure;

implementing, by the one or more mock objects, logic to verify compliance of the one or more delegation calls with the one or more determined predefined check types; and providing, by the one or more mock objects, results of the implemented logic to a debugger database for use in analyzing the service provider coding for errors.

2. A computer program product as in claim 1, wherein the dependent object delegation tester object comprises a unit test for a combination of operations comprising preparing data, calling a corresponding service of the service provider, and performing checks for compliance of the one or more delegation calls with the one or more predefined check types.

3. A computer program product as in claim 1, wherein the one or more predefined check types comprise a check relating to the service provider delegating a call to a local client proxy of a dependent object without changing parameters and without locking any host objects, and wherein an error situation arises when the local client proxy of the dependent object does not receive any call when the service provider is called with a specific dependent object node name.

4. A computer program product as in claim 1, wherein the one or more predefined check types comprise a check relating to locking of a host object when the service provider needs to first lock the host object before delegating a call to a local client proxy of a dependent object, and wherein an error situation arises when the service provider is called with a specific dependent object name and delegates the call to the dependent object local client proxy without locking the host object.

5. A computer program product as in claim 1, wherein the one or more predefined check types comprise a check relating to the service provider delegating a call to a local client proxy of a dependent object and needing to pass dependent object return data to an importing parameter object, and wherein an error situation arises when the service provider is called with a specific dependent object name and the call is delegated correctly to the local client proxy of the dependent object local client proxy, but the local client proxy of the dependent object returns data, at least some of which is not processed correctly by the service provider.

6. A computer program product as in claim 1, wherein the one or more predefined check types comprise a check relating to the service provider delegating a call to a local client proxy of a dependent object and needing to add and/or set dependent object return data to the service provider return data, and wherein an error situation arises when the service provider is called with a specific dependent object name and the call is delegated correctly to the local client proxy of the dependent object, but the local client proxy of the dependent object returns data that are not filled into return data of the service provider.

7. A computer program product as in claim 1, wherein the logic to verify compliance comprises the one or more mock objects being programmed to expect certain behavior consistent with the one or more predefined check types and to detect deviation from expected behavior in a delegation call from the service provider.

8. A computer program product as in claim 1, wherein the operations further comprise the dependent object delegation tester object preparing data for the simulated service call, and the providing further comprises the dependent object delegation tester object calling a corresponding service of an implementation of the service provider using the prepared data.

9. A computer-implemented method comprising:
providing a simulated service call to a service provider from a dependent object delegation tester object, the simulated service call prompting the service provider to make one or more delegation calls to dependent objects in an enterprise services infrastructure;
receiving the one or more delegation calls from the service provider by one or more mock objects, the one or more mock objects being part of a mock enterprise services infrastructure;
determining one or more predefined check types based on a provided description of the enterprise services infrastructure;
implementing, by the one or more mock objects, logic to verify compliance of the one or more delegation calls with the one or more determined predefined check types; and
providing, by the one or more mock objects, results of the implemented logic to a debugger database for use in analyzing the service provider coding for errors.

10. A computer-implemented method as in claim 9, wherein the dependent object delegation tester object comprises a unit test for a combination of operations comprising preparing data, calling a corresponding service of the service provider, and performing checks for compliance of the one or more delegation calls with the one or more predefined check types.

11. A computer-implemented method as in claim 9, wherein the one or more predefined check types comprise a check relating to the service provider delegating a call to a local client proxy of a dependent object without changing parameters and without locking any host objects, and wherein an error situation arises when the local client proxy of the dependent object does not receive any call when the service provider is called with a specific dependent object node name.

12. A computer-implemented method as in claim 9, wherein the one or more predefined check types comprise a check relating to locking of a host object when the service provider needs to first lock the host object before delegating a call to a local client proxy of a dependent object, and wherein an error situation arises when the service provider is called with a specific dependent object name and delegates the call to the dependent object local client proxy without locking the host object.

13. A computer-implemented method as in claim 9, wherein the one or more predefined check types comprise a check relating to the service provider delegating a call to a local client proxy of a dependent object and needing to pass dependent object return data to an importing parameter object, and wherein an error situation arises when the service provider is called with a specific dependent object name and the call is delegated correctly to the local client proxy of the dependent object local client proxy, but the local client proxy of the dependent object returns data, at least some of which is not processed correctly by the service provider.

14. A computer-implemented method as in claim 9, wherein the one or more predefined check types comprise a check relating to the service provider delegating a call to a local client proxy of a dependent object and needing to add and/or set dependent object return data to the service provider return data, and wherein an error situation arises when the service provider is called with a specific dependent object name and the call is delegated correctly to the local client proxy of the dependent object, but the local client proxy of the dependent object returns data that are not filled into return data of the service provider.

15. A computer-implemented method as in claim 9, wherein the logic to verify compliance comprises the one or more mock objects being programmed to expect certain behavior consistent with the one or more predefined check types and to detect deviation from expected behavior in a delegation call from the service provider.

16. A system comprising:
computer hardware configured to perform operations comprising:
providing a simulated service call to a service provider from a dependent object delegation tester object, the simulated service call prompting the service provider to make one or more delegation calls to dependent objects in an enterprise services infrastructure;

receiving the one or more delegation calls from the service provider by one or more mock objects, the one or more mock objects being part of a mock enterprise services infrastructure;

determining one or more predefined check types based on a provided description of the enterprise services infrastructure;

implementing, by the one or more mock objects, logic to verify compliance of the one or more delegation calls with the one or more determined predefined check types; and providing, by the one or more mock objects, results of the implemented logic to a debugger database for use in analyzing the service provider coding for errors.

17. A system as in claim 16, wherein the dependent object delegation tester object comprises a unit test for a combination of operations comprising preparing data, calling a corresponding service of the service provider, and performing checks for compliance of the one or more delegation calls with the one or more predefined check types.

18. A system as in claim 16, wherein the logic to verify compliance comprises the one or more mock objects being programmed to expect certain behavior consistent with the one or more predefined check types and to detect deviation from expected behavior in a delegation call from the service provider.

19. A system as in claim 16, wherein the computer hardware comprises a programmable processor and a memory storing instructions that, when executed by the programmable processor, cause the programmable processor to perform at least some of the operations.

20. A system as in claim 16, wherein the one or more predefined check types comprises a check relating to at least one of the service provider delegating a call to a local client proxy of a dependent object without changing parameters and without locking any host objects, locking of a host object when the service provider needs to first lock the host object before delegating a call to a local client proxy of a dependent object, the service provider delegating a call to a local client proxy of a dependent object and needing to pass dependent object return data to an importing parameter object, and the service provider delegating a call to a local client proxy of a dependent object and needing to add and/or set dependent object return data to the service provider return data.

* * * * *